US008588405B2

(12) United States Patent
Olivier et al.

(10) Patent No.: US 8,588,405 B2
(45) Date of Patent: Nov. 19, 2013

(54) METHOD OF COMMUNICATION BETWEEN A COMMUNICATION SERVER AND A TERMINAL

(75) Inventors: Francois Olivier, Illkirch (FR); Jean-François Rey, Brest (FR)

(73) Assignee: Alcatel Lucent, Paris (FR)

( * ) Notice: Subject to any disclaimer, the term of this patent is extended or adjusted under 35 U.S.C. 154(b) by 697 days.

(21) Appl. No.: 12/734,744

(22) PCT Filed: Dec. 19, 2008

(86) PCT No.: PCT/EP2008/068116
§ 371 (c)(1),
(2), (4) Date: Jun. 16, 2010

(87) PCT Pub. No.: WO2009/083515
PCT Pub. Date: Jul. 9, 2009

(65) Prior Publication Data
US 2010/0254529 A1  Oct. 7, 2010

(30) Foreign Application Priority Data

Dec. 21, 2007 (FR) ..................................... 07 60254

(51) Int. Cl.
*H04M 1/00* (2006.01)
*H04M 9/00* (2006.01)
*H04M 3/42* (2006.01)
(52) U.S. Cl.
USPC ............. 379/428.03; 379/201.04; 379/433.06

(58) Field of Classification Search
USPC .................. 379/428.03, 433.06, 201.04, 419, 379/433.07; 345/174; 370/401
See application file for complete search history.

(56) References Cited

U.S. PATENT DOCUMENTS

| 6,064,732 | A | 5/2000 | Pezzullo et al. |
| 7,187,368 | B2 * | 3/2007 | Rekimoto ..................... 345/174 |
| 7,885,272 | B2 * | 2/2011 | Burger et al. ................ 370/401 |
| 2003/0103602 | A1 | 6/2003 | Pence et al. |

OTHER PUBLICATIONS

E. Burger et al., "A Session Initiation Protocol (SIP) Event Package for Key Press Stimulus (KPML)", Internet Engineering Task Force Trust, Nov. 2006, pp. 1-50.
International Search Report, Submitted on May 20, 2010.

* cited by examiner

*Primary Examiner* — Thjuan K Addy
(74) *Attorney, Agent, or Firm* — Harness, Dickey & Pierce

(57) ABSTRACT

At least one example embodiment discloses terminals including at least one alterable function key and a display to display in proximity to the key an indication relating to the function of this key, which includes indicating to a communication server which types of indication the terminal is able to display in proximity to this key, sending, from the server to the terminal, information defining at least one KPML command that the server is capable of receiving and that it is capable of executing and information defining at least one indication associated with the command and which must be displayed on the terminal, in proximity to an adaptable function key depending on a telephone state of an active communication.

9 Claims, 2 Drawing Sheets

METHOD OF COMMUNICATION BETWEEN A COMMUNICATION SERVER AND A TERMINAL

FIELD

The invention concerns: a method of communication between a communication server and a terminal, for the implementation of this method.

BACKGROUND

The user of a telephone terminal needs to send commands to a communication server in order to have certain services beyond simply setting up telephone communications. In an analog telephone network, it is known to send commands to an automatic exchange by pressing a key or a series of keys (0 to 9, R, #, *, A, B, C, D) on the keypad of a telephone terminal. For example: the user presses the 3 key to switch to conference mode, 4 to request automatic call back, etc. Each of these digits is translated by a dual tone sent in the voice frequency band (method known as DTMF: Dual Tone Multifrequency).

In digital telephone networks with time division multiplexing, for companies, telephone terminals are known which comprise specific keys for fixed functions, but also keys known as alterable function keys, offering the user different contextual actions depending on the events occurring during a telephone communication. These alterable function keys are placed at the edge of a screen. A word, abbreviated word or an icon is displayed on this screen in proximity to each key with an alterable function, so as to inform the user of the current function of this key. The management of the assignment of the alterable functions and the display of the indications associated with the keys is fully centralized by the automatic exchange.

Technological evolution has led to voice and signaling telephone signals being routed in the form of data packets, using the Internet protocol (IP) family, in particular RTP (Real Time Transfer Protocol) for voice packets and SIP (Session Initiation Protocol) for signaling packets. In such an IP/SIP type network, it is known to send commands to a communication server by pressing, on the keypad of an SIP type telephone terminal, a key corresponding to a digit or a series of keys corresponding to a given series of digits. The IETF RFC 4730 document describes a method known as KPML (Key Press Markup Language) which is used to define and use these series of digits to control a communication server using the SIP signaling protocol.

This known KPML method uses SIP signaling protocol requests, called SUBSCRIBE and NOTIFY, to exchange messages between a communication server and a SIP type terminal when setting up each communication. Using these KPML messages, the server indicates to the terminal a set of pre-determined DTMF commands associated with a given communication, which this server is capable of receiving and interpreting. Each DTMF command consists of a press on a given key, or a series of presses on several given keys (from the keys 0 to 9, R, #, *, A, B, C, D).

If the user presses one or more keys corresponding to one of these pre-determined commands, the terminal must detect this command and notify the server. The terminal uses KPML messages to signal this press (or this series of presses on the given keys). The terminal can thus control a function in the server.

SUMMARY

The control possibilities with the twelve numerical keys of a traditional telephone keypad being relatively limited, it is desirable to be able to add alterable function keys to a SIP type terminal. It would then be necessary to provide means to dynamically display a word, an abbreviated word or an icon on a screen in proximity to the alterable function keys, so as to indicate to the user the current function of each key. Furthermore, it is desirable for these indications to be displayed making the best possible use of the characteristics of the screen.

The KPML method has not been designed for this. It is only able to detect and transmit commands consisting of a digit or a few digits. It cannot therefore display on a screen a word, abbreviation or icon. Furthermore, the KPML method does not take into account the display capabilities of the terminal screen, when various terminal models can be connected to the same network: The number of characters which can be displayed may vary, but so may the type of alphabet. The screen may or may not have graphical possibilities allowing an icon to be displayed.

Terminals are known which use a method specific to a manufacturer, to receive and display indications on a screen dynamically, in proximity to the adaptable function keys. A telephone application asks a presentation server to send data to the terminal representing indications to be displayed on the screen of this terminal. The presentation server knows in advance the characteristics of the screen (number of rows and columns of pixels, number of colors which can be displayed) and the characteristics of the keys (number of keys and layout in relation to the screen) of each terminal of the network to which it is connected. It adapts the display format of the indications to the characteristics of the screen and the keys of the terminal to which it must send data. The document US 2003/01013602 describes such a method for dynamically displaying indications on the screen of a telephone, in proximity to the adaptable function keys, while using voice mail.

Another known method involves sending, from a web server to a terminal, data representing indications to be displayed on the screen of this terminal, in the form of a web page. This page is sent using the standardized protocol known as HTTP (Hypertext Transfer Protocol) or equivalent evolutions of this protocol. This page is described using the standardized language known as HTML (High Level Markup Language). If the terminal has sufficient processing and display resources, it may include a traditional web browser used to display such a web page.

According to a first method of implementing this known method, there are, strictly speaking, no adaptable function keys. They are replaced with hypertext links placed in a text, or in pull-down menus, in the web page displayed. The user can browse this page using a pointing device, and click on a link instead of pressing a key. The communication server does not therefore need to know the characteristics of the keys for each terminal.

According to a second method of implementing this known method, the terminal comprises adaptable function keys at the edge of the screen, and a web page displayed on the screen gives indications placed respectively in proximity to each adaptable function key. It is then necessary for the web server to know in advance the characteristics of the keys (number of keys and layout in relation to the screen) of each terminal of the network to which it is connected. It adapts the display format of the indications to the characteristics of the keys of the terminal to which it must send data.

A web page can only be used on terminals with sufficient processing power and memory capacity. This therefore excludes the use of low cost SIP terminals.

Furthermore, this known method is not perfectly satisfactory since the web page displayed must be adapted to each call, and must be able to evolve during the call, since it contains indications for the use of the adaptable function keys, and the user can jump instantly from one communication to another, for example during call waiting. In practice, the time to create a new web page, and the time for it to be processed by the terminal make it difficult to ensure the coherence between the web page displayed and the telephone communication in progress on a given terminal.

The aim of the invention is to propose a method of communication between a communications server and a terminal, which allows indications to be displayed dynamically on the screen of a terminal, in proximity to adaptable function keys, so as to indicate to the user the current function of each key; which allows these indications to be displayed making the best possible use of the characteristics of the screen; and which can be applied on a SIP terminal with a low processing power and a low memory capacity.

The purpose of the invention is a method of communication between a communication server and a terminal comprising at least one adaptable function key and display means suitable for displaying, in proximity to this key, an indication concerning the function of this key; including the steps involving:

indicating to this server which types of indication this terminal is able to display in proximity to this key;

and sending, from the server to the terminal, information defining at least one KPML command that the server is capable of receiving and that it is capable of executing; characterized in that it also includes a step involving sending, from the server to the terminal, information defining at least one indication associated with this command and which must be displayed on the terminal, in proximity to an adaptable function key depending on the telephone state of an active communication.

The method characterized in this way allows adaptable function keys to be used on all SIP type terminals comprising programmable processing means, even if their processing power and their memory capacity are low, since the step involving sending, from the server to the terminal, information defining an indication associated with a KPML command, involves much less processing than the reception and the processing of a web page.

The invention also has the objective of a terminal and a server for the implementation of this method.

BRIEF DESCRIPTION OF THE DRAWINGS

The invention will be better understood and other characteristics will appear with the help of the description below and the accompanying figures.

DETAILED DESCRIPTION

Figure 1:
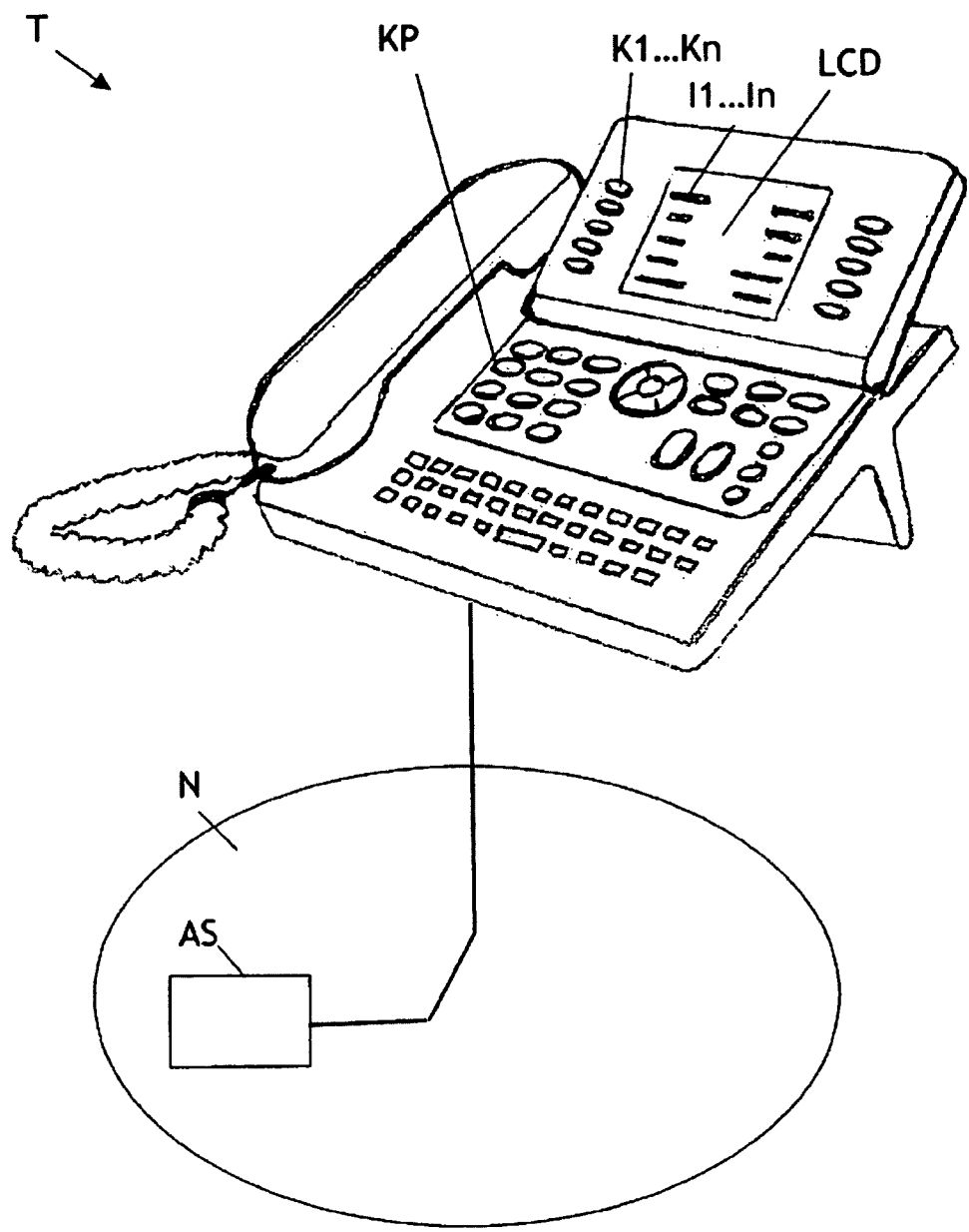
FIG. 1 represents an example of a SIP telephone terminal comprising adaptable function keys.

The example of a telephone terminal T shown in FIG. 1 comprises a liquid crystal display screen LCD, a traditional keypad KP with twelve keys 0-9, *, #, and adaptable function keys K1, . . . , Kn along the right-hand edge and along the left-hand edge of this screen LCD. The terminal T is connected to a telephone network N supporting the SIP signaling and comprising a communication server AS. Throughout the duration of a communication, the screen LCD displays an indication, respectively I1, . . . , In, in proximity to each of the adaptable function keys, K1, . . . , Kn, which can be used during the communication concerned; for example to place a first communication on hold in order to set up a second communication. Each of these indications can be a word, a string of words or an icon.

The method according to the invention is an improvement on the known KPML method. This known KPML method uses SIP signaling protocol requests, called SUBSCRIBE and NOTIFY, to exchange messages between a communication server and a SIP type terminal when setting up each communication. Using these KPML messages, the server indicates to the terminal a set of pre-determined DTMF commands associated with a given communication, which it is liable to receive from a user. Each DTMF command consists of a press on a given key, or several given keys (from the keys 0 to 9, R, #, *, A, B, C, D). If the user applies one of these commands, the terminal must detect this command and signal it to the server. In other words, if the terminal detects a press on a key (or a series of key presses) corresponding to a command which has been indicated in advance by the server, the terminal uses KPML messages to signal this press (or this series of presses on the given keys). It thus controls a function in the server.

The known KPML method does not plan the use of the keys 0 to 9, R, #, *, A, B, C, D, with a fixed respective function. It makes no allowance for the use of additional adaptable function keys; in particular, it does not allow icons and/or character strings to be displayed in proximity to adaptable function keys. The method according to the invention is an improvement allowing additional adaptable function keys to be used.

Figure 2:
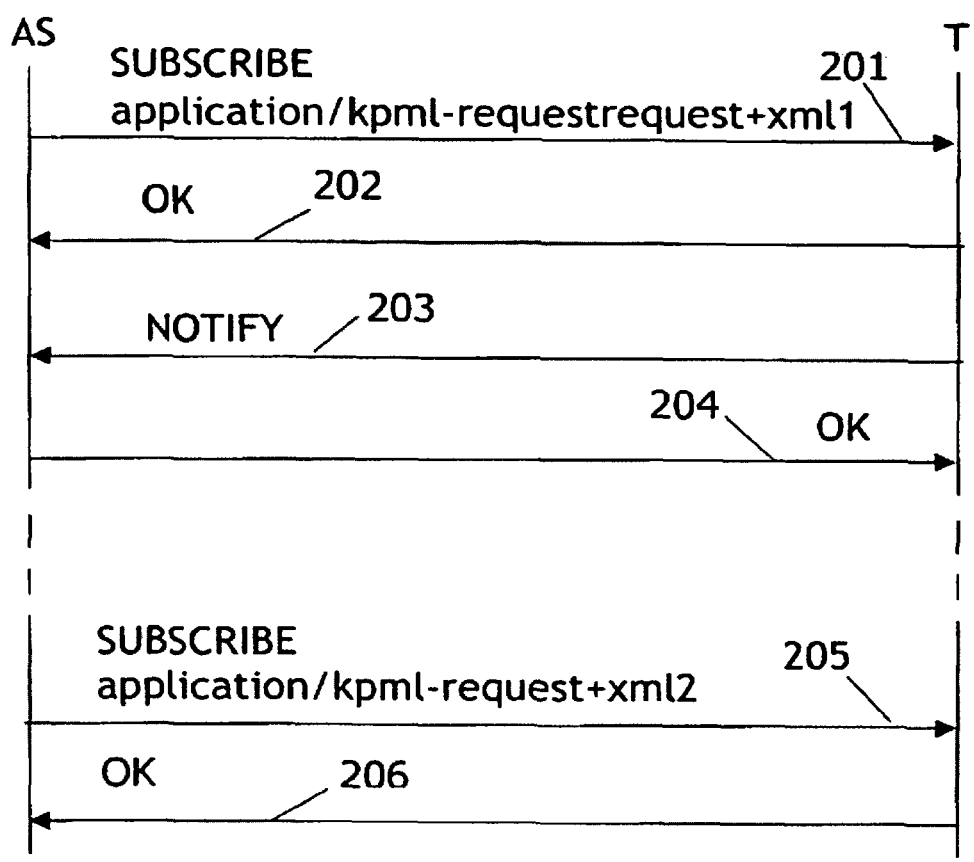
FIG. 2 represents an example of the exchange of SIP signaling messages between this example of a SIP terminal and a communication server, in accordance with the method according to the invention.

FIG. 2 represents an example of the exchange of SIP signaling messages between an example of a terminal T and an example of a communication server AS, in accordance with the method according to the invention. By hypothesis, the terminal T has been connected to a network supporting SIP signaling, and at the moment it is registered with a server (called "Registrar") in this network, the terminal T indicated its capacities by sending this server the indications:

Accept-Language: en
Content-Type: image/jpeg which respectively mean that the user of the terminal T wishes for the indications to be in English, and that the terminal T can display icons.

At the moment a given communication is set up, the implementation steps are:

Step 201: the communication server AS indicates to the terminal T all the possible actions, in other words the key or series of keys corresponding to each of the commands of a pre-determined set of commands associated with the state of the communication in progress. To do this, it sends a SIP message called SUBSCRIBE to the terminal T. The effect of this message is to subscribe this server to the terminal T, so that it is informed of certain actions when they are detected by the terminal T. This SUBSCRIBE message contains:

The identity of the requesting application: application/kpml-request.

A document in XML (Extensible Markup Language). This document, called xml1 in this example, describes a pre-determined set of commands, and a set of indications intended for the user, each command being respectively associated with an indication.

Each command of this set is described as a DTMF command of the traditional KPML method, in other words it is described as a press or a series of presses on keys designated by the characters 0 to 9, R, #, *, A, B, C, D. For example a command is described by "013", in other words a press on the fixed function key "0", then a press on the fixed function key "1", then a press on the fixed function key "3". If the terminal has no adaptable function key, it can use these commands in the traditional manner: the user must remember to successively press the (fixed function) keys 0, 1, 3, of the traditional keypad to carry out this command.

If the terminal has adaptable function keys, and a software for implementing the method according to the invention, this terminal autonomously decides that the adaptable function key "Ki" will control this function. When it detects a press on the key "Ki", the terminal will issue DTMF signals identical to those usually produced by a series of presses on the fixed function keys "0", "1", "3". Furthermore, the terminal displays, in proximity to the key Ki (the position of which it knows), the indication associated with this command, for example the character string "REQUEST CALL BACK". Therefore, the user does not need to remember the series 0, 1, 3 or the position of the key "Ki". It should be noted that the terminal still allows the series of presses 0, 1, 3 to be used if the user nonetheless wishes to use it.

Step 202: The terminal T acknowledges receipt by sending the server AS a SIP message called OK, and it stores in memory this set of commands and this set of indications for the duration of the communication or the current state of the communication concerned, unless a new set of commands and a new set of indications replace them during this communication.

Step 203: The user presses a key, or a series of keys, corresponding to one of the possible commands. The terminal T detects that a user has pressed the key or the series of keys corresponding to one of the commands of the set of pre-determined commands associated with the current state of the communication in progress. It sends the server AS a SIP message called NOTIFY, containing the identity of the command.

Step 204: The server AS acknowledges receipt by sending an OK message to the terminal T. It will then apply the processing corresponding to this command.

Step 205: Later, following an event during this same communication, the server AS indicates to the terminal T all actions which are now possible, bearing in mind this event. To do this, it sends a new SUBSCRIBE message to the terminal T. This SUBSCRIBE message contains:

The identity of the requesting application: application/kpml-request.

A new document in XML (Extensible Markup Language). This document, called xml2 in this example, describes a new pre-determined set of commands, and a new set of associated indications respectively.

Step 206: The terminal T acknowledges receipt by sending the server AS an OK message, and it stores this new set of commands and this new set of indications in memory in place of the previous ones.

To send data used to display an indication in proximity to each adaptable function key, two preferential embodiments are proposed.

According to a first embodiment, the indications consist of character strings in natural language. This assumes that the server knows the display capabilities of the terminal, to know whether it accepts Latin characters or Chinese ideograms for example. Several traditional methods can be used. For example, the terminal can dynamically signal its display capabilities when sending the REGISTER message sent to its "Registrar" (not shown on the figures). The communication server supervises the "Registrar" to be notified of the appearance of a station on the network.

According to another embodiment, the terminal informs the communication server when it sends it an OK message, in step 202, using the header fields of this OK message: ACCEPT-LANGUAGE, ACCEPT Example of fragment of KPML message, with indications in natural language:

---

```
SUBSCRIBE sip:43045@subA.example.com SIP/2.0
Via: SIP/2.0/TCP client.example.com;branch=3qo3j0ouq
From: <sip:AS@example.com>;tag=978675
To: <sip:43045@example.com>
Call-ID: 12345601@subA.example.com
CSeq: 21 SUBSCRIBE
Contact: <sip:AS@client. example.com>
Max-Forwards: 70
Event: kpml ;remote-tag="<sip:phn@example.com;tag=jfi23>" ;local-
tag="sip:gw@subA.example.com;tag=oi43jfq";
call-id="12345598@subA.example.com"
Expires: 7200
Accept: application/kpml-response+xml
Content-Type: application/kpml-request+xml
Content-Length: 295
<?xml version="1.0" encoding="UTF-8"?>
<kpml-request xmlns="urn:ietf:params:xml:ns:kpml-request"
xmlns:xsi="http://www.w3.org/2001/XMLSchema-instance"
xsi:schemaLocation=
"urn:ietf:params:xml:ns:kpml-request kpml-request.xsd" version="1.0">
        <pattern>
            <regex display="DIS00" state="early">0</regex>
            <regex display="DIS01" state="all">011</regex>
            <regex display="DIS02" state="confirmed" >012</regex>
            <regex display="DIS03" state="focus" >013</regex>
        </pattern>
<display id="DIS00" lang="en">Override routing</display>
<display id="DIS00" lang="fr">Passer outre le routage</display>
<display id="DIS01" lang="en">Report unsolicited call</display>
<display id="DIS01" lang="fr">Signaler un appel malveillant</display>
...
In this example, the line: <regex display="DIS00"
state="early">0</regex> refers to 2 other lines, each corresponding to the
display in natural language in a given language:
<display id="DIS00" lang="en">Override routing</display>
<display id="DIS00" lang="fr">Passer outre le routage</display>
```

---

The terminal will display the indication corresponding to one of these two lines, depending on the language the user has assigned to the terminal T. If for example the user has assigned the language French, the terminal displays the indication corresponding to: <display id="DIS00" lang="fr">Passer outre le routage</display>

In the example of a fragment of the KPML message above:
The line: <regex display="DIS00", state="early">0</regex>
associates a command: <regex display="DIS00", state="early">
with a press on the key "0".
When the terminal receives this line, it must display an indication called DIS00, which is a character string, if the state of the telephone communication is: Ringing ("early" in SIP terminology).

The line: <regex display="DIS01", state="all">011</regex>
associates a command: <regex display="DIS01", state="all">
with a press on the key "0" immediately followed by a press on the key "1". When the terminal receives this line, it must display an indication called DIS01, which is a character string, whatever the state of the telephone communication.
<display id="DIS00" lang="en">Override routing</display>

The line: <regex display="DIS02", state="confirmed">012</regex> associates a command: <regex display="DIS02", state="confirmed">
with a press on the key "0" followed by a press on the key "1" and a press on the key "2". When the terminal receives this line, it must display an indication called DIS02, which is a character string, if the state of the telephone communication is: Conversation ("confirmed" in SIP terminology).

The telephone communication state may for example be:
  Ringing: "early",
  Idle: "terminated"
  Conversation with a correspondent: "confirmed"
  On hold: "inactive"
  In conference: "focus"
  Etc.

According to a second embodiment, an indication consists of an icon and a character string in natural language.

With a view to displaying indications in natural language and icons, the previous example of a fragment of a KPML message comprises additional information:

```
    <display id="DIS00" lang="en"
img="http://www.example.com/images/ovrd.jpg">Override routing</display>
    <display id="DIS00" lang="fr"
img="http://www.example.com/images/ovrd.jpg">Passer outre le routage</display>
```

This additional information corresponds to the fact that the indication to be displayed contains both:
  an icon which is available at the address: img=http://www.example.com/images/ovrd.jpg
  and a character string which is "Override routing".

According to one variant embodiment, the information defining at least one indication associated with this command is a keyword, and the terminal consults a third-party document to translate this keyword into an indication which can be understood by the user, only a URL (Universal Resource Locator) address of this third-party document being sent from the server to the terminal. This third-party document can for example be a translation dictionary. The dictionary used is downloaded by the terminal from the URL address provided in an extension of the KPML message. The terminal then uses this dictionary to translate the keywords received from the server.

In the example of a fragment of the KPML message above:

```
    <pattern>
        <regex display="DIS00" cid="1" state="early">0</regex>
        <regex display="DIS01" cid="1" state="all">011</regex>
        <regex display="DIS02" cid="1" state="confirmed">012</regex>
        <regex display="DIS03" cid="1" state="focus">013</regex>
    </pattern>
<cid id="1" version="03">http://www.example.net/phonedisplay</dict>
``` the attribute cid (content-indirection) indicates the URL: http://www.example.net/phonedisplay</dict>
of the dictionary in which to search for the indices DIS00, DIS01, etc.

The advantage of this method is that the dictionary only needs to be downloaded once (as long as the version of the dictionary remains constant), thus reducing the size of the KPML messages.

The method according to the invention can easily be adapted, by a person skilled in the art, for a terminal comprising a touch screen or pull-down menus rather than traditional keys.

The invention claimed is:

1. A method of communication between a communication server and a terminal including at least one adaptable function key and a display configured to display in proximity to the at least one adaptable function key an indication concerning the function of the at least one adaptable function key, the method comprising:
    indicating to the server which types of indication the terminal is able to display in proximity to the at least one adaptable function key;
    sending, from the server to the terminal, information defining at least one KPML command that the server is capable of receiving and that it is capable of executing
    and sending, from the server to the terminal, information defining at least one indication associated with the at least one KPML command and which must be displayed on the terminal, in proximity to an adaptable function key depending on the telephone state of an active communication,
    wherein the information defining at least one indication associated with the at least one KPML command includes the translations of a character string respectively in several languages, and in that the terminal selects one of the translations based on the language assigned to the terminal by a user.

2. Method according to claim 1, wherein the information defining at least one indication associated with the at least one KPML command includes an image.

3. Method according to claim 1, wherein the information defining at least one indication associated with the at least one KPML command is a keyword, and in that the terminal consults a third-party document to translate the keyword into an indication which can be understood by the user, only the address of the third-party document being sent from the server to the terminal.

4. A telephone terminal comprising:
    at least one adaptable function key,
    a display configured to display in proximity to the at least one adaptable function key an indication concerning a command which can be activated using the at least one adaptable function key,
    a receiver configured to receive information defining at least one KPML command which can be sent to a server, and an indication associated with the KPML command, and which must be displayed on the terminal, in proximity to the at least one adaptable function;
    wherein the receiver includes a translation receiver configured to for receive translations of a character string respectively in several languages, and for selecting one of the translations depending on the language assigned to this terminal by a user.

5. Terminal according to claim 4, wherein the receiver includes an image receiver.

6. Terminal according to claim 4, wherein the receiver includes an address receiver configured to receive an address of a third-party document.

7. A communication server configured to,
    receiver information indicating to this server which types of indication a terminal is able to display in proximity to an adaptable function key;
    send to said terminal information defining at least one KPML command that the server is capable of receiving and that it is capable of executing
    and to said terminal information defining at least one indication associated with the at least one KPML command and which must be displayed on the terminal, in proximity to the adaptable function key; and send translations of a character string respectively in several languages.

8. A non-transitory storage medium on which a program is saved, the program comprising instructions which, when executed in a terminal, involve receiving information defining at least one indication associated with a KPML command and which must be displayed on a terminal, in proximity to an adaptable function key;
   wherein the program include instructions which, when executed in the terminal, involve receiving information including the translations of a character string respectively in several languages, and instructions which, when executed in the terminal, involve selecting one of the translations depending on the language assigned to this terminal by a user.

9. A non-transitory storage medium on which a program is saved, the program including instructions which, when executed in a server, involve sending to a terminal information defining at least one indication associated with a KPML command and which must be displayed on this terminal, in proximity to an adaptable function key;
   wherein the instructions further involve sending translations of a character string respectively in several languages.

* * * * *